US008682811B2

(12) United States Patent
Burges et al.

(10) Patent No.: US 8,682,811 B2
(45) Date of Patent: Mar. 25, 2014

(54) USER-DRIVEN INDEX SELECTION

(75) Inventors: Chris J. Burges, Bellevue, WA (US); Denyong Zhou, Redmond, WA (US); Xiao Li, Bellevue, WA (US); Yan Ke, Redmond, WA (US); Tao Tao, Bellevue, WA (US); Xiaodong Fan, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 575 days.

(21) Appl. No.: 12/650,285

(22) Filed: Dec. 30, 2009

(65) Prior Publication Data

US 2011/0161260 A1  Jun. 30, 2011

(51) Int. Cl.
*G06F 15/18* (2006.01)
(52) U.S. Cl.
USPC ................................................ 706/12
(58) Field of Classification Search
None
See application file for complete search history.

(56) References Cited

U.S. PATENT DOCUMENTS

| 6,944,609 | B2 | 9/2005 | Witbrock | |
|---|---|---|---|---|
| 2002/0112028 | A1* | 8/2002 | Colwill, Jr. | 709/218 |
| 2006/0294223 | A1* | 12/2006 | Glasgow et al. | 709/224 |
| 2007/0255689 | A1* | 11/2007 | Sun et al. | 707/3 |
| 2008/0244428 | A1* | 10/2008 | Fain | 715/764 |
| 2009/0006442 | A1 | 1/2009 | Anderson | |
| 2009/0094137 | A1* | 4/2009 | Toppenberg et al. | 705/27 |
| 2009/0106270 | A1* | 4/2009 | Shukla et al. | 707/100 |
| 2009/0132551 | A1* | 5/2009 | Allen et al. | 707/10 |
| 2009/0157729 | A1 | 6/2009 | Herlocker | |
| 2009/0164395 | A1 | 6/2009 | Heck | |
| 2009/0204575 | A1* | 8/2009 | Olston et al. | 707/3 |
| 2009/0210369 | A1* | 8/2009 | Shao et al. | 706/21 |
| 2009/0240677 | A1 | 9/2009 | Parekh | |

OTHER PUBLICATIONS

'Do not crawl in the Dust: Different URLs with similar text': Yossef, 2007, ACM, 978-1-59593-654-7.*
'Crawling the web: Discovery and maintence of large scale web data': Cho, Stanford University, 2001 Dissertation Thesis.*
Marguerite Reardon, 'Start-up launches social search engine', CNET News.com Published Jan. 21, 2004, [retrieved on Aug. 25, 2012]. Retrieved from the Internet <http://www.news.com/2100-1038-5144567.html>.*

(Continued)

*Primary Examiner* — Kakali Chaki
*Assistant Examiner* — Peter Coughlan
(74) *Attorney, Agent, or Firm* — Steve Wight; Carole Boelitz; Micky Minhas

(57) ABSTRACT

Techniques for index building are described. Clickcounts of respective training URLs may indicate a number of times that corresponding training URLs were clicked in search engine results. A machine learning algorithm implemented on a computer computes a trained model that is then stored. The clickcounts and respective URLs are passed to the machine learning algorithm to train the model to predict probabilities based on feature vectors of URLs. An index of web pages is built for a set of URLs that identify the web pages. Feature vectors for the URLs are computed. Probabilities of the web pages of the URLs being searched in the future by users may be computed by processing the feature vectors with the trained model. The probabilities may be used to determine which of the URLs to include in the index.

19 Claims, 5 Drawing Sheets

(56) References Cited

OTHER PUBLICATIONS

Boyan et al.; A Machine Learning Architecture for Optimizing Web Search Engines; AAAI Workshop on Internet-Based Information Systems, Portland, Oregon, 1996.

Kan et al.; A User Profile-based Approach for Personal Information Access: Shaping Your Information Portfolio; Proceedings of the 15th international conference on World Wide Web; May 23-26, 2006.

Chau et al.; A Machine Learning Approach to Web Page Filtering using Content and Structure Analysis; Journal Decision Support Systems archive, vol. 44 Issue 2, Jan. 2008.

Page et al.; The PageRank Citation Ranking: Bringing Order to the Web; Technical report, Stanford Digital Library Technologies Project; Jan. 29, 1998.

Kleinberg; Authoritative Sources in a Hyperlinked Environment; Journal of the ACM (JACM) JACM Homepage archive; vol. 46 Issue 5, Sep. 5, 1999.

Liu et al.; BrowseRank: Letting Users Vote for Page Importance; SIGIR'08, Jul. 20-24, 2008.

Richardson et al.; Beyond PageRank: Machine Learning for Static Ranking; WWW '06 Proceedings of the 15th international conference on World Wide Web; 2006.

* cited by examiner

USER-DRIVEN INDEX SELECTION

BACKGROUND

An index is an organized list of references or pointers to a body of text or other indexable material. An index at the back of a book is an example of a type of index. An electronic index can be generated by parsing a body of documents, for example, and creating an alphabetized (or otherwise structured) list of keywords in the documents with pointers to which documents (and possibly also locations in the documents) contain the keywords. As used herein, "index" refers to the electronic variety of index.

To find web pages that match user queries, Internet search engines use large scale indexes of web pages available on the Internet. The number of documents and other types of web pages on the Internet makes the task of generating an index difficult. An index of all web pages takes significant computing resources to create and store. Such an all-encompassing index is inefficient to use due to its size; the time to search in index increases with its size.

Techniques have been used to selectively choose which web pages will or will not be included in an index. However, these techniques have not tried to predict which web pages are likely to be searched by users. Rather, they have taken the approach of using estimates of the so-called general importance of web pages by checking the web hyperlink structure. Detail will be provided below. That is, web pages have been chosen to be included in a search engine index without taking into account actual user search behavior or user-driven factors.

The terms "URL" and "web page" are used interchangeably herein. While a URL may identify a particular instance of a web page, the web page is the actual document and its content. A URL points to a web page and is therefore a shorthand way of referring to the web page itself.

The PageRank technique used by some search engines is a popular method for index selection. PageRank and its variants like HITS (hyperlink-induced topic search) assign a score to each web page according to the hyperlink structure of the web. A web page with a high score (a sufficient number of links into and/or out from the web page) will be selected into the index. However, it is not clear if these kinds of link metrics are effective criterion to decide if a web page should be included in an index. Moreover, such a score is computed from a web graph without considering web content, URL properties, users' search behaviors, and so on.

Techniques related to user-driven index selection are described below.

SUMMARY

The following summary is included only to introduce some concepts discussed in the Detailed Description below. This summary is not comprehensive and is not intended to delineate the scope of the claimed subject matter, which is set forth by the claims presented at the end.

Techniques for index building are described. Consider a case where an index for the web has already been built by using some heuristics, which could be any existing index selection techniques. Suppose also that a web search engine adopts this index and uses it to serve millions of users' daily searches. After some time, it is possible to check which URLs in this index are searched, that is, clicked in search results, and which URLs in this index are not searched, by looking at the search engine logs or any other available data sources, like Toolbar logs. This type of information can indicate what users need, and can also be used to train a machine learning model to predict the probability that a given web page will be searched by users. Consequently, such a model can be used to decide if a web page will be indexed or not when the existing index is refreshed. A web page which is predicted to be likely to be searched should be indexed and a web page which is less likely to be searched should not be indexed. It is also possible to train other kinds of machine learning models, for example, a ranking model, such that the top URLs in the rank list are supposed to be more likely to be searched by users. This may be facilitated by using users' implicit search feedback to train a machine learning based model which is used to predict which web pages are likely to be searched.

Many of the attendant features will be explained below with reference to the following detailed description considered in connection with the accompanying drawings.

BRIEF DESCRIPTION OF THE DRAWINGS

The present description will be better understood from the following detailed description read in light of the accompanying drawings, wherein like reference numerals are used to designate like parts in the accompanying description.

DETAILED DESCRIPTION

Embodiments discussed below relate to building indexes, which may be used by search engines, by selecting web pages (URLs) to include in an index based on user-driven criteria, possibly used in combination with other criteria. Explanation below will proceed with discussion of how a search engine uses an index and how user behavior and interaction with the search engine can be recorded. Some general concepts for improved index generation will be discussed, including an approach for estimating the likelihood that a web page identified by a given URL will be searched by an arbitrary user independent of any query. A system for obtaining data for such computation will be described, followed by description of details for using implementations of machine learning algorithms to estimate likelihoods of users searching web pages and using such estimates to build an index.

Figure 1:
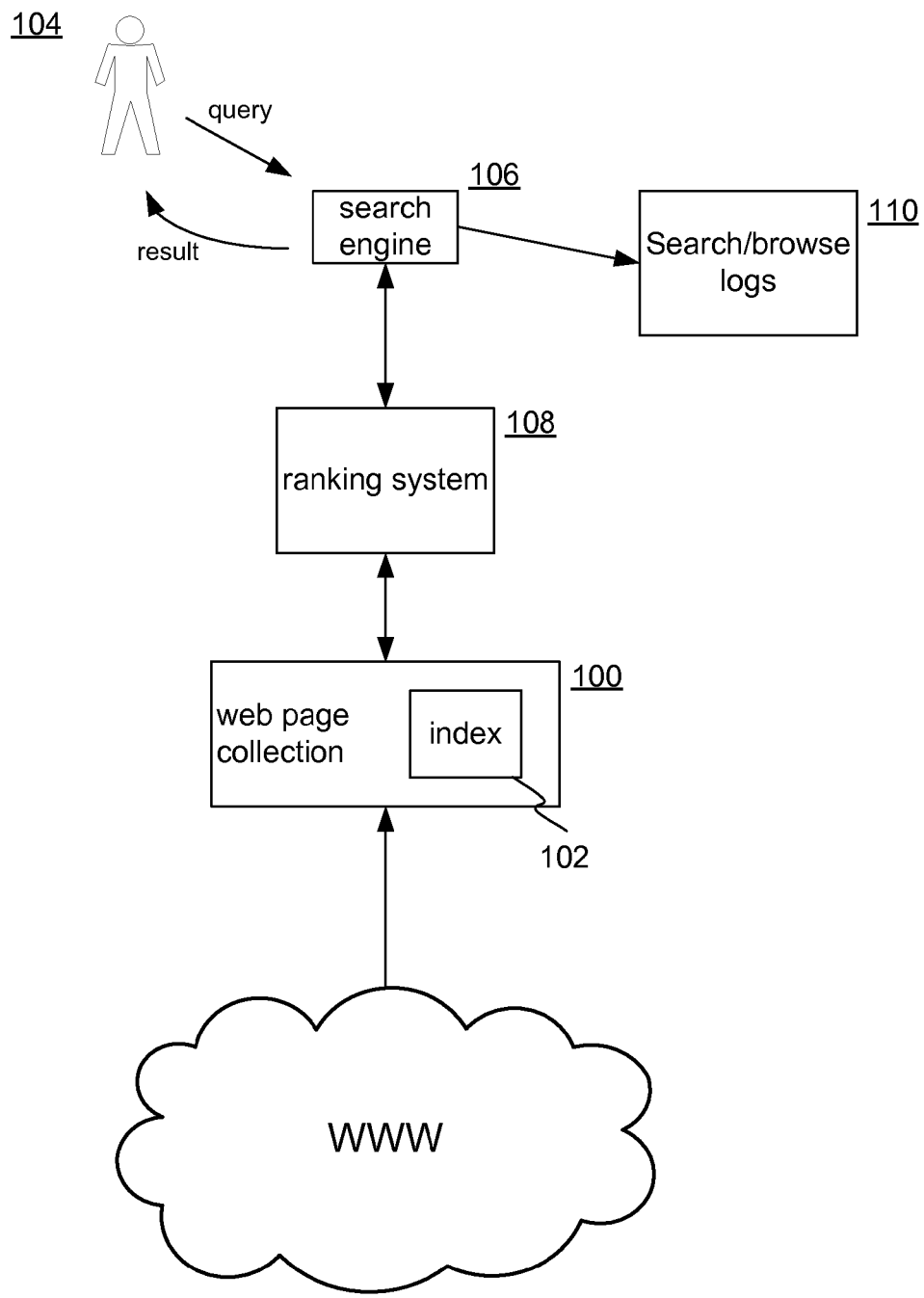
FIG. 1 shows a system for searching web pages on the Internet.

FIG. 1 shows a system for searching web pages on the Internet. A web page collection 100 may be built by crawling the World Wide Web (WWW). The web page collection 100 may include text documents in various forms including markup language documents, word processing documents, PowerPoint slides, PDF documents, and other well known forms of web pages. Generally, the text in the web pages will be analyzed to build an index 102 of the collected web pages 100. The index 102 may be a set of keywords and web pages that contain such keywords, for example. When a user 104 with a browser submits a query to a search engine 106, the search engine 106 uses a ranking system 108 to find matching web pages and rank the results in order of computed relevancy based on various factors, often including numerous and complex factors besides the matches having keywords in the index 102. When search results are presented to the user 104, the results may be in the form of an HTML web page with links (URLs) to the matching web pages, and when the user clicks on a link the search engine 106 records the selection of this link in search/browse logs 110. The logs 110 can include many types of information about the behavior of user 104, for instance the length of time between sending the result and the clicking of the link, the rank on the page of the link, advertisements present in the results, and so on. The logs 110 may be as basic as many entries, and every entry indicates a URL that was selected/clicked, a time and date of the search or click, and so on.

One of ordinary skill in the art of search engine technology will appreciate that different designs and approaches may be used, but each may involve capturing information about user behavior that indicates how or whether the web page is important to a user. The search engine may actually first use the index 102 to obtain candidate matches and the ranking system 108 may then rank the results.

Figure 2:
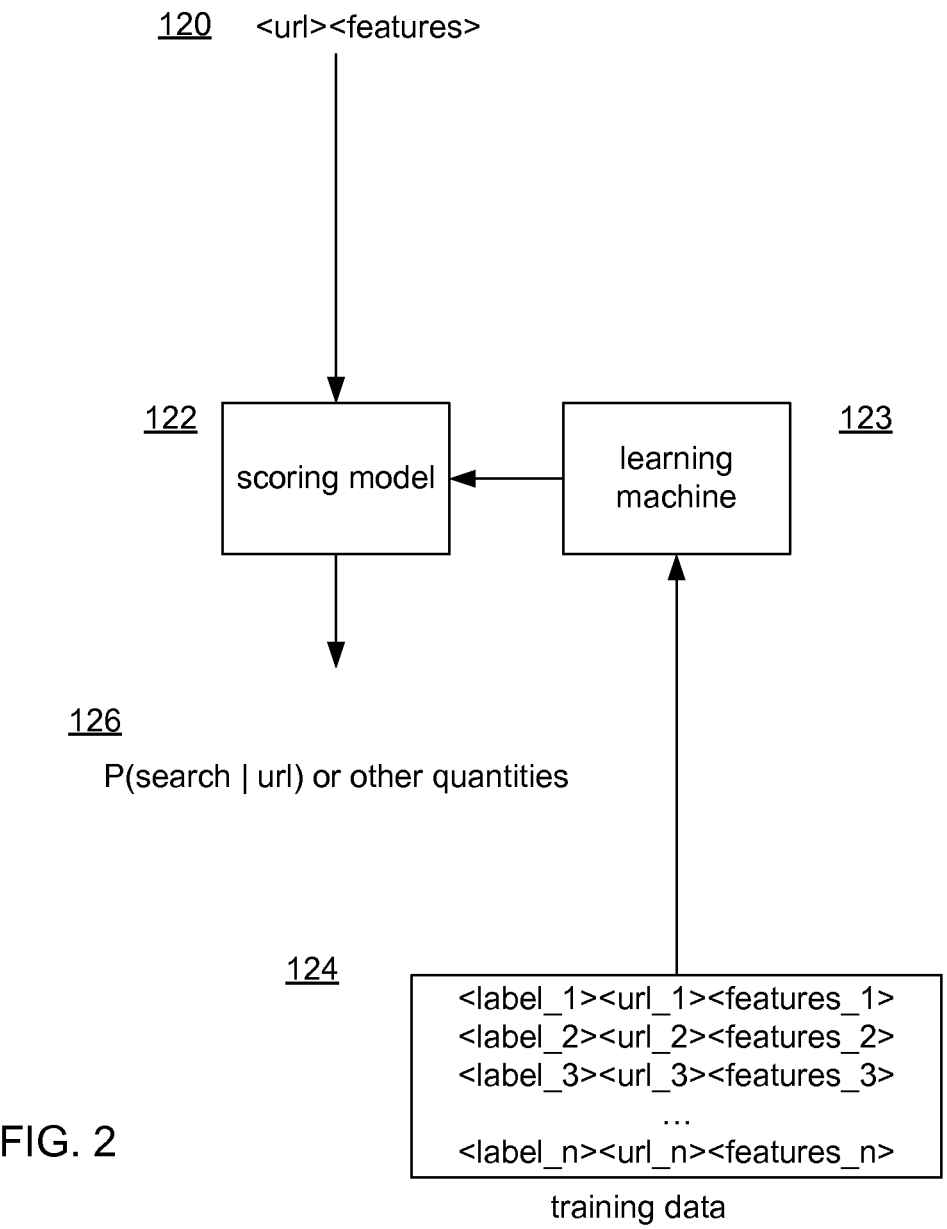
FIG. 2 shows a general process for obtaining information that can be used to determine which web pages should be included in an index.

FIG. 2 shows a general process for obtaining information that can be used to determine which web pages should be included in an index. A web page may be selected to be in an index based on a computation of how likely the web page will be searched, which differs from the use of only a PageRank score. While high PageRank scores might correlate with increased probability of being searched, such relation is only a correlation and not a reliable prediction. PageRank is not targeted to predict a probability of being searched in the future by a user. Instead, PageRank tries to simulate how users will surf on the web by checking the hyperlink structure between web pages. For predicting how likely a web page will be searched in the future, users' previous browsing and searching behaviors can be expected to be helpful. Indicia of user behavior and search targets can be combined with other factors, such as PageRank or HITS score, number of inlinks/outlinks (links to a page or links leading out from a page), URL patterns (such as URL length), web page contents, domain information (such as the unique number of users in each month), etc. In terms of machine learning, all of these factors together are called a feature representation or feature vector.

User behavior can be leveraged for dynamically ranking web pages that match a particular query. This is often referred to as dynamic rank. With dynamic rank, web pages are evaluated for relevancy to a particular query. However, pages are ranked for inclusion in an index independent of any particular query. This is often referred to as static rank or query-independent rank. Techniques for dynamically ranking search results may not generally lend themselves to statically ranking web pages independent of any particular query.

Referring again to FIG. 2, given a URL which may be in a collection of URLs from the Internet, a feature vector 120 (described in detail later) for the URL is passed to a scoring model 122 previously trained by a learning machine 123 with training data 124. The training data 124 may be vectors like feature vector 120 but with varying values for the features. The model 122 uses the features in the feature vector 120, including in particular click information about the URL, to compute a probability 126 that the URL will be searched in the future or any other related quantities.

Put another way, given a web page represented as a feature vector $x \in R^n$ where x has n features, it is possible to estimate the probability P(click|x) in a search engine, where "click" might be a binary value ("click" or "no click"), a magnitude or rate of click (e.g., "10 clicks", "100 clicks", "5 clicks per day"), a proportion of clicks (e.g., 3 clicks out of 1000 total or 3 clicks of out of 100 clicks by that user or 5 clicks out of all clicks for that URL's domain, etc.). For training a model, the "click" will be used as the "label" in 124.

Regarding the training data 124, the data may be simply clickthrough data from one or more search engines over a given time period, such as the previous 30 days, the previous week, etc. The general format for training data may be "<label><url><features>" or the like. The "features" (or counts) may, as discussed above, take various forms, such as a series of click counts for search engines, click counts for a series of prior time periods, a click rate, and other forms that may reflect user behavior toward the URL and in particular when the URL was included in a search engine result set or clicked within a search result set. A URL's features could include click counts from different search settings. For example, there may be a click count for a product search, a click count for a news search, a click count for a specific country, and so on.

Figure 3:
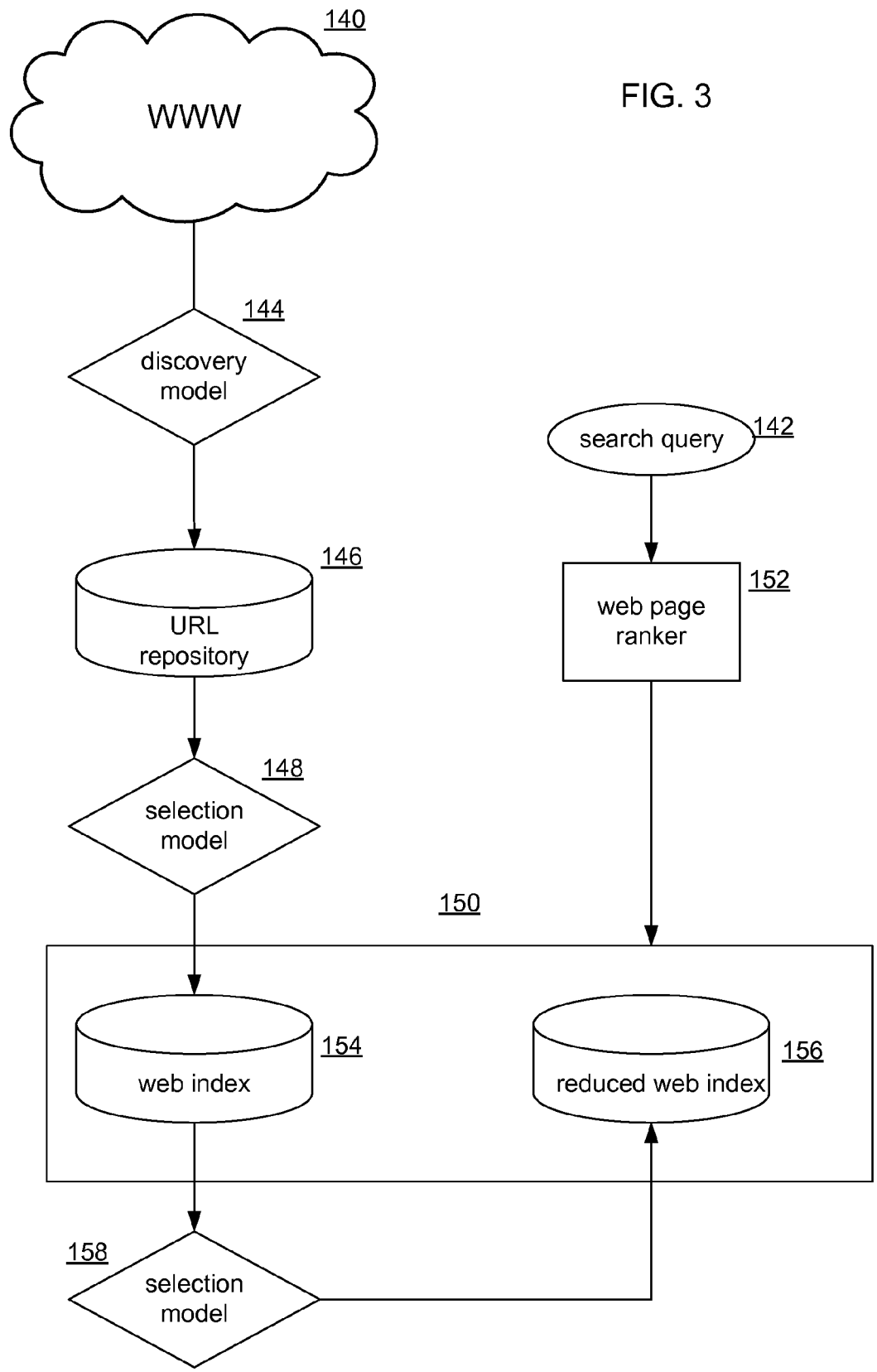
FIG. 3 shows a system for incorporating user-based index selection into a search engine.

FIG. 3 shows a system for incorporating user-based index selection into a search engine. With a goal of searching the WWW 140 to find web pages, documents, etc, matching a given search query 142. The WWW 140 is searched using a discovery model 144 to obtain a collection of URLs in a URL repository 146. The discovery model 144 may include algorithms implemented by a crawler for efficiently traversing the WWW 140 to obtain different web pages. Given a collection of URLs in URL depository 146, a selection model 148 is then used to filter the URLS. The selection model is the scoring model 122 that has been described.

Given a base set of filtered URLs outputted by selection model 148, the next step is to build an index system 150. The index system is used by a web page ranker 152 (search engine). The mechanisms by which a web page ranker uses an index system are known and described in detail elsewhere. The index system 150 may have a primary web index 154 and a reduced or secondary web index 156. The secondary web index 156 is a subset of the primary web index 154; the primary web index 154 includes some URLs that are not in the secondary web index 156. When the search engine or web page ranker 162 performs a search, the secondary web index 156 is used first. If results are found, then the search is complete and the primary web index 154 is not used. If no results or a small number of results for a user query are found in the secondary web index 156, then the more comprehensive primary web index 154 may be consulted to find any matching web pages (returning the URLs for those pages). In one embodiment, the primary web index 154 may omit the URLs indexed in the second web index 156.

A selection model 158 is used to form the secondary web index 156. The mechanics of building a secondary web index are known and described elsewhere. The selection model 158 is trained by using the same techniques used to train the selection model 148, but used features that are used are different. The difference is that when training the selection model 158 the training examples can have content features like document length, in addition to link features, click features and URL patterns which are used to train the selection model 148 because the web pages have been fully indexed into 154.

Figure 4:
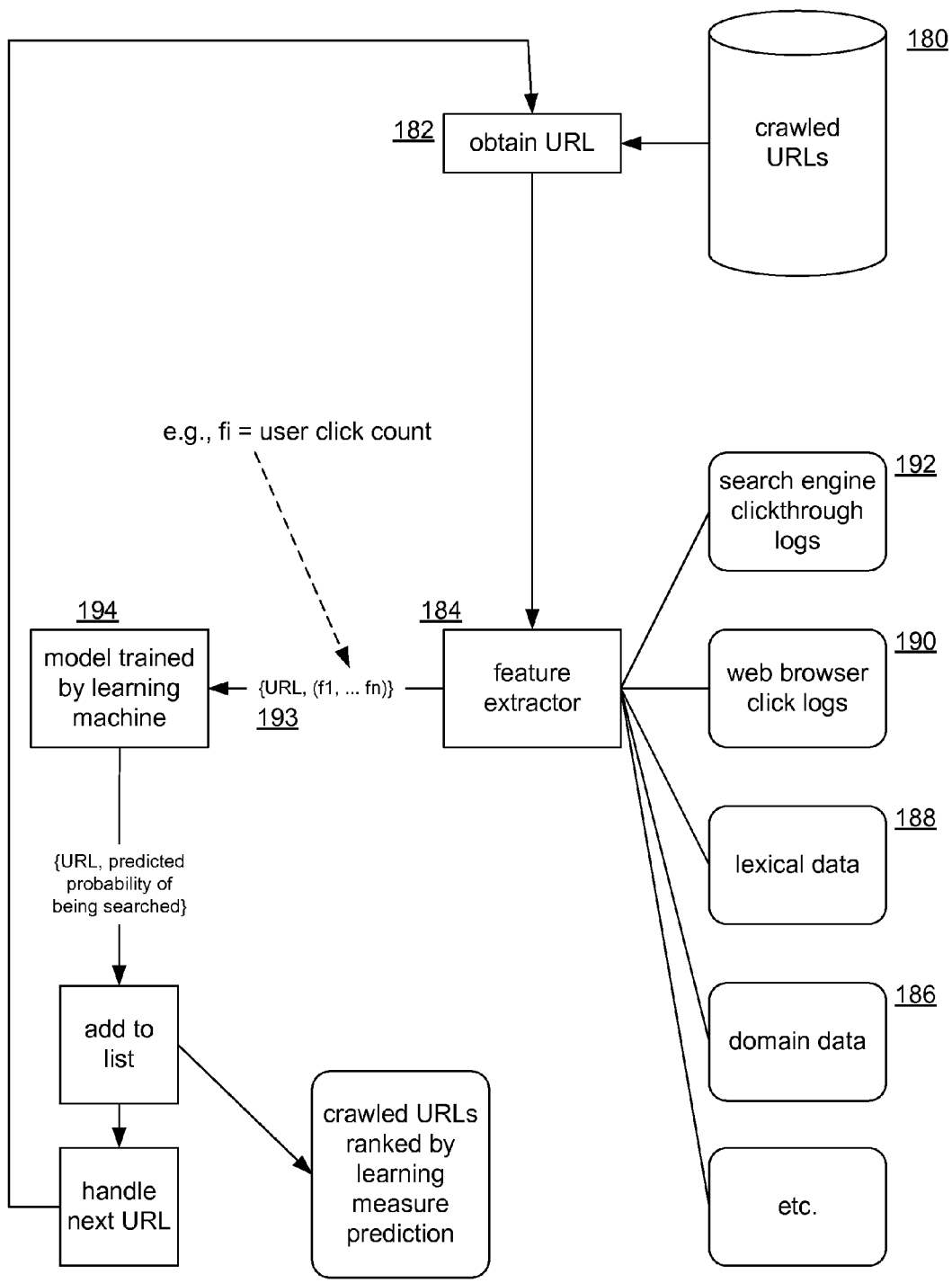
FIG. 4 shows details for evaluating a collection of URLs for possible inclusion in a reduced web index.

FIG. 4 shows details for evaluating a collection of URLs for possible inclusion in a web index. As described earlier, a collection of crawled or otherwise obtained sample of URLs 180, e.g. from the Internet, may be available for index formation. Each URL in the collection of URLs 180 may be processed as follows. A URL is obtained 182 (until no URLs remain). The URL is passed to a feature extractor 184. Details of feature extraction and building a feature vector have been explained elsewhere (but not the types/combinations of features and their manner of use as described herein).

The feature extractor 184 may analyze the text of the URL itself to obtain features such as length of URL, levels in the URL (e.g., the number of parts in the path), etc. The feature extractor 184 may also extract a host or domain name from the URL and obtain data about that domain from pre-existing domain data 186. Thus, features about the popularity of the URL's domain may be included, for instance, the total or relative number of times the domain has been searched by users, and so on. For example, the URL "www.linkedin.com/pub/" may contain "linkedin" which may be evaluated as being popular and thus a feature (in the vector) corresponding to the domain of the URL may be given increased weight. Multiple domain information features of varying type may be included in a feature vector.

The feature extractor 184 may also obtain characteristics of the text content of the URL itself. For example, words or phrases may be extracted from the URL (not its web page) to obtain information about the words or phrases from a set of lexical data 188. Features pertaining to the presence of people names or related keywords may also be included. For example, the URL "www.andrew.cmu.edu/user/yke/" may be found to include keyword "user" followed by initials "yke", which may give weight to another feature. Even particular generic domain names such as "edu" or "gov" may be used to weight a feature.

Web browser click logs 190, discussed above, may also be used to add features to the URL's feature vector. For example, if users are clicking on a web page in their browser, regardless of how access to the web page has been provided, such clicks may be recorded, accumulated to a central server or service, and the accumulated click logs 190 can be searched to find user click behavior directed to the URL currently being evaluated. Multiple features may be computed for different numbers of click counts. Clicks may also be aggregated to a containing domain, based on the assumption that if many pages in a domain are clicked, other pages in the same domain will likely be clicked.

Similar to browser click logs 190, search engine clickthrough logs 192 may be used to form features for the URL. Clicks on the obtained 182 URL when listed in a search engine result may be discounted by click-impression ratios. That is, the number of clicks over the number of impressions may be more telling than the raw number of clicks. Moreover, domain or host or L1 clicks can be discounted by the number of documents (number of clicked pages divided by number of total pages). Click trends may also form features. For example, increasing number of clicks over periods of time may indicate likelihood of being searched, whereas a decreasing click rate may indicate less likelihood of being searched.

Web graph features may also be included in the feature vector. A web graph being a graph that models the link relations between crawled web pages. A URL's average clicks on inlinked neighbors and/or outlinked neighbors, the average clicks on a domain/host, and averaged click trend (increasing or decreasing) may also be used. Other features may also be used, including domain registration time, the number of documents in each domain, the time it takes to crawl a domain, and so on.

When a feature vector 193 has been prepared the feature vector may be passed to a trained model 194. Existing machine learning methods can be used. For example, linear classifiers such as a Perceptron, and linear regression, Boosting algorithms, Bayesian networks, and so on, may be used. In view of the scales involved, an online learning approach (iterative improvement; "online" refers to a type of algorithm) may be used rather than a batch-type learning algorithm. The particular algorithm and model are not significant as learning machines and training of statistical models are known and described elsewhere. In one embodiment, logistic regression is used, in which case a formula for computing probability is:

$p(\text{click}|x)=1/(1+e^{-\Sigma \beta_i x_i})$, for feature vector $x=(x_1, x_2, \ldots, x_n)$.

Figure 5:
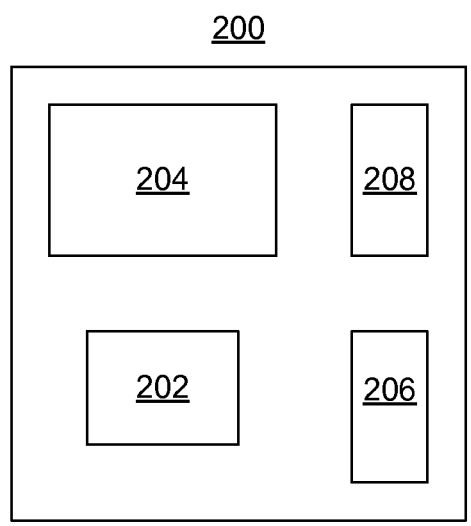
FIG. 5 shows a computing device which may be used to perform or host any of the steps or components described above.

FIG. 5 shows a computing device 200 which may be used to perform or host any of the steps or components described above. The computing device, e.g., a server, workstation, etc., may include one or more processors 202, memory and/or storage 204 (e.g., RAM, disk storage, and other storage media), input/output facilities 206, a network interface 208, one or more data buses, user input devices, and so on. The computing device 200 (or multiple cooperating computing devices) may be programmed or configured to run software as described above, including logging of search clickthroughs, index generation, feature extraction, a search engine that uses an index, URL analysis, etc. That is to say, embodiments and features discussed above can be realized in the form of information stored in volatile or non-volatile computer or device readable media. This is deemed to include at least media such as optical storage (e.g., CD-ROM), magnetic media, flash ROM, or any means of storing digital information. The stored information can be in the form of machine executable instructions (e.g., compiled executable binary code), source code, bytecode, or any other information that can be used to enable or configure computing devices to perform the various embodiments discussed above. This is also deemed to include at least volatile memory such as RAM and/or virtual memory storing information such as CPU instructions during execution of a program carrying out an embodiment, as well as non-volatile media storing information that allows a program or executable to be loaded and executed. The embodiments and features can be performed on any type of computing device, including portable devices, workstations, servers, mobile wireless devices, and so on, as appropriate for the task at hand.

The invention claimed is:

1. A method of building an index of web pages, the method comprising:
   accessing a set of URLs collected by crawling the Internet;
   accessing a list of URLs collected from one or more sources that collect clicks of URLs by users;
   for each URL in the set of URLs, for a given URL:
      computing a measure of likelihood that the given URL will be searched by a user in the future based on whether the URL has been clicked by a user,
      storing the given URL and its measure,
   selecting a subset of the URLs based on their respective stored measures, where some of the URLs in the set of URLs are omitted from the subset based on the measures of the omitted URLs;
   generating a first index of the web pages pointed to by the URLs in the subset of URLs, the first index not including the omitted URLs, the first index comprising a mapping between contents of the web pages and the URLs of the web pages, and generating a second index of the web pages pointed to by the URLs omitted from the subset, the second index not including the URLs in the first index; and
   using the index by a search engine to search for search results for arbitrary search queries submitted by users, wherein when the first index does not satisfy a given query, using the second index to attempt to satisfy the given query.

2. A method according to claim 1, wherein the list of URLs comprises clickthrough data obtained from a web search engine, wherein URLs in the list were collected by the web search engine when a user clicked on the URLs in search results provided by the web search engine.

3. A method according to claim 2, further comprising, for the given URL, generating a feature comprised of a plurality of features computed based on the given URL, wherein at least one of the features comprises an indication or measure of whether or an extent to which the given URL was clicked by a user.

4. A method according to claim 3, wherein the given URL was clicked when presented in a set of search results from a search engine.

5. A method according to claim 1, wherein the determining whether the given URL has been clicked by a user is based on click data collected by web browsers, the click data comprising URLs captured by browsers when users clicked on URLs in web pages displayed in the browsers.

6. A method according to claim 1, further comprising accessing information comprising measures of popularity of respective domains or web sites, wherein the computing the measure of the given URL is further based on a measure of popularity of a domain or web site containing a web paged identified by the given URL.

7. A method according to claim 1, wherein the computing the measure of the given URL is also based on either a length or a number of path levels in the URL.

8. One or more computer-readable storage media storing information to enable a computing device to perform a process, wherein the computer-readable storage media is not a signal, the process comprising:
receiving a clickthrough log comprised of information indicating URLs that were clicked by users when presented in search results, the clickthrough log having been accumulated by a search engine that provided the search results to the users in response to queries from the users, the search engine having an existing index of web pages crawled from the Internet; receiving a list of candidate URLs, the candidate URLs comprising URLs being considered for inclusion in a new index of the web pages crawled from the Internet, each URL identifying a web page on the Internet;
training a model and storing the model on the computing device, wherein the model is trained using training data comprised of URLs and information indicating whether the URLs were clicked in a search result of the search engine;
selecting a URL from the list of candidate URLs, computing a feature vector of the selected URL by computing features of the URL that are included in the feature vector, the features including a click feature that is based on information from the clickthrough log that indicates whether or how often or how many times the selected URL has been clicked in search results of the search engine;
passing the feature vector to the trained model and outputting, according to the trained model, a measure of how likely the selected URL is to be searched in the future by a user submitting a future unknown query to the search engine;
using the measure to determine whether to include the selected URL in the new index; and
building the new index and providing the new index to the search engine which uses the new index to answer user queries for web pages, wherein the search engine uses the new index by receiving a user query, searching the new index for web pages that match the user query, and when no web pages are found in the new index, using a second index that indexes web pages not indexed in the new index.

9. One or more computer-readable storage media according to claim 8, wherein the machine learning based model training is executed.

10. One or more computer-readable storage media according to claim 8, wherein the feature vector further includes one or more text properties of the URL.

11. One or more computer-readable storage media according to claim 10, wherein the one or more text properties comprises either a length of the selected URL or a number of levels in the URL.

12. One or more computer-readable storage media according to claim 8, wherein the feature vector is computed by identifying a domain name in the selected URL, obtaining domain information indicating user clicks of web pages in the domain, and including the domain information as a feature in the feature vector.

13. One or more computer-readable storage media according to claim 8, further comprising accessing web browser click data collected from a plurality of web browsers, the web browser click data indicating whether or how many times various URLs were clicked by users using the web browsers.

14. One or more computer-readable storage media according to claim 8, where the determining whether to include the selected URL comprises determining whether the measure is above a given threshold.

15. A method performed by one or more computing devices, the method comprising:
receiving clickcounts of respective training URLs, each clickcount indicating a number of times that a corresponding training URL was clicked in a set of search engine results;
running an implementation of a machine learning algorithm on the one or more computing devices to compute a trained model that is then stored on the one or more computing devices, and passing the clickcounts and respective URLs to the machine learning algorithm to train the model to predict probabilities based on feature vectors of URLs; and
building a first index and a second index of web pages by receiving a set of URLs identifying the web pages, building feature vectors for the URLs, computing probabilities of the web pages of the URLs being searched in the future by users by processing the feature vectors with the trained model, and determining whether to include individual of the URLs in either the first index or the second index based on the computed probabilities, wherein the first index and the second index comprise respective mappings between contents of the web pages and the URLs of the web pages.

16. A method according to claim 15, wherein the feature vectors further include value of same text feature types as the types of text features of the training URLs, and the computed probabilities are based at least in part on those values as computed for the URLs in the set of URLs.

17. A method according to claim 15, wherein link based features are computed for the training URLs and used to train the model such that the probabilities are based at least in part on the link features.

18. A method according to claim 15, further comprising using the built first index and the second index by a search engine to compute results that satisfy user search requests submitted to the search engine, wherein the second index is used to satisfy a given query when determined that the first index was insufficient for the given query.

19. A method according to claim 18, wherein the click-counts of the training URLs are obtained from the same search engine that uses the built first index and second index.

* * * * *